United States Patent
Gong et al.

(10) Patent No.: US 10,832,462 B2
(45) Date of Patent: Nov. 10, 2020

(54) IMAGE SYNTHESIS METHOD, IMAGE CHIP, AND IMAGE DEVICE

(71) Applicant: Huawei Technologies Co., Ltd., Shenzhen (CN)

(72) Inventors: Yu Gong, Shanghai (CN); Rui Gong, Chengdu (CN); Jingwei Chen, Shanghai (CN); Yonghong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/502,517

(22) Filed: Jul. 3, 2019

(65) Prior Publication Data
US 2019/0325630 A1    Oct. 24, 2019

Related U.S. Application Data

(63) Continuation of application No. 15/493,272, filed on Apr. 21, 2017, now Pat. No. 10,489,948, which is a (Continued)

(30) Foreign Application Priority Data

Oct. 22, 2014    (CN) .......................... 2014 1 0566548

(51) Int. Cl.
*G06T 11/40* (2006.01)
*G06T 11/60* (2006.01)
(Continued)

(52) U.S. Cl.
CPC ............ *G06T 11/60* (2013.01); *G06T 1/0007* (2013.01); *G06T 3/40* (2013.01); *G06T 7/11* (2017.01);
(Continued)

(58) Field of Classification Search
CPC ............ H04N 21/4438; G06F 3/04842; G06F 17/30905
(Continued)

(56) References Cited

U.S. PATENT DOCUMENTS

| 5,329,616 A | 7/1994 | Silverbrook |
| 6,020,894 A | 2/2000 | Silverbrook |
| 2006/0026530 A1 | 2/2006 | Shepherd et al. |
| 2009/0214090 A1 | 8/2009 | Hayes |

(Continued)

FOREIGN PATENT DOCUMENTS

| CN | 101170651 A | 4/2008 |
| CN | 101299328 A | 11/2008 |

(Continued)

*Primary Examiner* — Thomas J Lett
(74) *Attorney, Agent, or Firm* — Slater Matsil, LLP

(57) ABSTRACT

Embodiments of the present invention disclose an image chip. The image chip includes: a processor for dividing an image frame into at least two image segments, a read circuit for reading the at least two image segments in a time-division manner, and an image synthesizer for successively performing image synthesis on the at least two image segments according to a time sequence read by the read circuit. The image frame comprises multiple layers and each layer in the multiple layers is a rectangular layer having two first boundaries. Two first boundaries of a first image segment in the at least two image segments correspond to two neighboring boundaries in all the first boundaries of the multiple layers. The image synthesis for each image segment in the at least two image segments comprises image synthesis for all sublayers in the each image segment.

20 Claims, 6 Drawing Sheets

Related U.S. Application Data continuation of application No. PCT/CN2015/092193, filed on Oct. 19, 2015.

(51) Int. Cl.

| | | |
|---|---|---|
| *G06T 3/40* | (2006.01) | |
| *G06T 7/11* | (2017.01) | |
| *G06T 7/13* | (2017.01) | |
| *G06T 1/00* | (2006.01) | |
| *G06F 3/0481* | (2013.01) | |

(52) U.S. Cl.
CPC .............. G06T 7/13 (2017.01); G06T 11/40 (2013.01); *G06F 3/0481* (2013.01); *G06T 2207/10016* (2013.01); *G06T 2207/20021* (2013.01); *G06T 2207/20212* (2013.01)

(58) Field of Classification Search
USPC ........................................................ 345/629
See application file for complete search history.

(56) References Cited

U.S. PATENT DOCUMENTS

| | | | |
|---|---|---|---|
| 2012/0050320 A1 | 3/2012 | Verbeque et al. | |
| 2012/0198545 A1 | 8/2012 | Keenan et al. | |
| 2014/0153634 A1* | 6/2014 | Inada | H04N 21/23439 375/240.01 |
| 2015/0113582 A1* | 4/2015 | Ushiyama | H04N 21/2662 725/115 |

FOREIGN PATENT DOCUMENTS

| | | |
|---|---|---|
| CN | 102750134 A | 10/2012 |
| CN | 102999943 A | 3/2013 |
| CN | 104010212 A | 8/2014 |
| CN | 104361556 A | 2/2015 |
| EP | 0475601 A2 | 3/1992 |
| EP | 0924652 A2 | 6/1999 |
| JP | H03223791 A | 10/1991 |
| JP | H06261202 A | 9/1994 |
| JP | 2000235643 A | 8/2000 |
| JP | 2003101759 A | 4/2003 |
| JP | 2006048042 A | 2/2006 |

* cited by examiner

IMAGE SYNTHESIS METHOD, IMAGE CHIP, AND IMAGE DEVICE

CROSS-REFERENCE TO RELATED APPLICATIONS

This application is a continuation of U.S. patent application Ser. No. 15/493,272, filed on Apr. 21, 2017, which is a continuation of International Application No. PCT/CN2015/092193, filed on Oct. 19, 2015, which claims priority to Chinese Patent Application No. 201410566548.2, filed on Oct. 22, 2014. The disclosures of the aforementioned applications are hereby incorporated by reference in their entireties.

TECHNICAL FIELD

The present embodiments relate to the field of image processing technologies, and in particular, to an image synthesis method, an image chip, and an image device.

BACKGROUND

On a terminal screen, an application program generally displays content for a user in a form of a window, that is, an image that the user sees by using the terminal screen. When multiple application programs all need to display content on the terminal screen, an image displayed on the terminal screen is generally obtained after multiple windows displayed by the multiple application programs are overlapped and synthesized. If the user enables an application program, the application program presents a window on the terminal screen and displays content in the window. In this case, if an alarm box of another application program pops up on the terminal screen, the alarm box generally covers a part of the content in the window of the application program, and a result eventually displayed on the terminal screen is an image displayed after the window displayed by the application program and a window displaying the alarm box are overlapped.

To implement synthesized display of content corresponding to multiple windows, an available method is to make each window correspond to one layer in a memory. An image is actually drawn in the memory, and an image in each layer indicates content that needs to be displayed in a window. If a window covers a part of another window, a value of a pixel eventually displayed on a terminal screen is implemented by adding up, according to a required proportion, values of pixels that are of the two layers in the memory and that are at a same screen location, and content eventually displayed in the multiple windows is obtained by adding up layer-by-layer, according to a corresponding proportion, pixel values of a part mutually covered by multiple layers.

In a current technology, images of multiple layers are synthesized in an off-line mode. In the off-line mode, a layer that needs to be displayed is pre-read before being displayed, a pixel value of each point on a terminal screen is obtained by calculation and written into a memory. When the layer needs to be displayed, specific content is read from the memory into which the pixel value is written, and the specific content is displayed on the terminal screen. Therefore, pixel value calculation can be performed only after all layers are completely read. Consequently, a moment for calculating the pixel value and a moment for displaying the pixel value cannot keep synchronous. When there are many image frames that need to be displayed, a relatively long period of time is needed to wait for complete read-in of the layers, and relatively much time is needed to calculate the pixel values, which reduces image synthesis efficiency, and cannot meet a requirement of a current application program.

SUMMARY

Embodiments of the present invention provide an image synthesis method, an image chip, and an image device, so as to improve processing efficiency of image synthesis.

To resolve the foregoing technical problems, the embodiments of the present invention provide the following technical solutions.

According to a first aspect, an embodiment of the present invention provides an image chip used for image synthesis. The image chip includes an obtaining unit, configured to separately obtain two coordinates, on a first coordinate axis, corresponding to two boundaries that are of each layer in multiple layers of an image frame and that are perpendicular to the first coordinate axis, so as to obtain multiple coordinates corresponding to the multiple layers. The image chip also includes a layer division unit, configured to divide, by using the multiple coordinates, the image frame into at least two image segments perpendicular to the first coordinate axis, where two boundaries of any image segment correspond to two neighboring coordinates in the multiple coordinates, the any image segment includes a part that is in at least one layer and that falls within an interval at which the image segment is located, and a part that is in any layer and that falls within the interval at which the image segment is located is a sublayer of the any layer. Additionally, the image chip includes an image reading unit, configured to read, along a direction of the first coordinate axis, in a time-division manner and according to a scanning sequence, the at least two image segments obtained by division by the layer division unit. The image chip also includes an image synthesis unit, configured to successively perform image synthesis on the at least two image segments according to a time sequence in which the image reading unit reads the at least two image segments in the time-division manner, so as to generate display data corresponding to the image frame, where image synthesis for an image segment includes image synthesis for all sublayers that are included in the image segment.

With reference to the first aspect, in a first possible implementation manner of the first aspect, the image reading unit is specifically configured to: along the direction of the first coordinate axis and according to the scanning sequence, read each sublayer in a first image segment at a first time, and read each sublayer in an $n^{th}$ image segment at an $n^{th}$ time; and repeat this step until n is equal to N, where n is an integer greater than or equal to 2, and N is a quantity of image segments included in the at least two image segments.

With reference to the first aspect or the first possible implementation manner of the first aspect, in a second possible implementation manner of the first aspect, the image reading unit includes: a control module and at least one read channel, where the control module is configured to separately allocate, among the at least one read channel and at an $m^{th}$ time, one read channel to each sublayer in an $m^{th}$ image segment obtained by division by the layer division unit, where m is any integer less than or equal to N, and N is the quantity of image segments included in the at least two image segments; and each read channel is configured to read one sublayer that is allocated by the control module to the read channel at the $m^{th}$ time.

With reference to the second possible implementation manner of the first aspect, in a third possible implementation manner of the first aspect, the control module is specifically configured to: when a quantity of all sublayers in the $m^{th}$ image segment is less than or equal to a quantity of read channels in the at least one read channel, allocate all the sublayers in the $m^{th}$ image segment to the at least one read channel at the $m^{th}$ time, where one unique sublayer is allocated to one read channel at the $m^{th}$ time.

With reference to the second possible implementation manner of the first aspect, in a fourth possible implementation manner of the first aspect, the control module is specifically configured to: when a quantity of all sublayers in the $m^{th}$ image segment is greater than a quantity of read channels in the at least one read channel, allocate all the sublayers in the $m^{th}$ image segment to the at least one read channel at several times within the $m^{th}$ time, where one sublayer is allocated to one read channel in one allocation process.

With reference to the second or the third possible implementation manner of the first aspect, in a fifth possible implementation manner of the first aspect, the control module is further configured to: when another sublayer, except an already read sublayer, in a layer to which the already read sublayer in the $m^{th}$ image segment belongs is already read, release a read channel allocated to the already read sublayer in the $m^{th}$ image segment; or when there is another unread sublayer, except an already read sublayer, in a layer to which the already read sublayer in the $m^{th}$ image segment belongs, continue to read the another unread sublayer by using a read channel allocated to the already read sublayer in the $m^{th}$ image segment.

According to a second aspect, an embodiment of the present invention further provides an image device, including the image chip according to any one of the foregoing first aspect, or any possible implementation manner of the first aspect, and a display, where the display is configured to display data generated by the image chip.

According to a third aspect, an embodiment of the present invention further provides an image synthesis method. The method includes separately obtaining two coordinates, on a first coordinate axis, corresponding to two boundaries that are of each layer in multiple layers of an image frame and that are perpendicular to the first coordinate axis, so as to obtain multiple coordinates corresponding to the multiple layers. The method also includes dividing, by using the multiple coordinates, the image frame into at least two image segments perpendicular to the first coordinate axis, where two boundaries of any image segment correspond to two neighboring coordinates in the multiple coordinates, the any image segment includes a part that is in at least one layer and that falls within an interval at which the image segment is located, and a part that is in any layer and that falls within the interval at which the image segment is located is a sublayer of the any layer; reading, along a direction of the first coordinate axis, the at least two image segments in a time-division manner and according to a scanning sequence. The method also includes successively performing image synthesis on the at least two image segments according to a time sequence of reading the at least two image segments, so as to generate display data, where image synthesis for an image segment includes image synthesis for all sublayers that are included in the image segment.

With reference to the third aspect, in a first possible implementation manner of the third aspect, the reading, along a direction of the first coordinate axis, the at least two image segments in a time-division manner and according to a scanning sequence includes: along the direction of the first coordinate axis and according to the scanning sequence, reading each sublayer in a first image segment at a first time, and reading each sublayer in an $n^{th}$ image segment at an $n^{th}$ time; and repeating this step until n is equal to N, where n is an integer greater than or equal to 2, and N is a quantity of image segments included in the at least two image segments.

With reference to the third aspect, in a second possible implementation manner of the third aspect, the reading, along a direction of the first coordinate axis, the at least two image segments in a time-division manner and according to a scanning sequence includes: separately allocating, among at least one read channel and at an $m^{th}$ time, one read channel to each sublayer in an $m^{th}$ image segment, where m is any integer less than or equal to N, and N is a quantity of image segments included in the at least two image segments; and reading each sublayer in the $m^{th}$ image segment by using each read channel allocated to each sublayer.

With reference to the second possible implementation manner of the third aspect, in a third possible implementation manner of the third aspect, the separately allocating, among at least one read channel and at an $m^{th}$ time, one read channel to each sublayer in an $m^{th}$ image segment includes: when a quantity of all sublayers in the $m^{th}$ image segment is less than or equal to a quantity of read channels in the at least one read channel, allocating all the sublayers in the $m^{th}$ image segment to the at least one read channel at the $m^{th}$ time, where one unique sublayer is allocated to one read channel at the $m^{th}$ time; or when a quantity of all sublayers in the $m^{th}$ image segment is greater than a quantity of read channels in the at least one read channel, allocating all the sublayers in the $m^{th}$ image segment to the at least one read channel at several times, where one sublayer is allocated to one read channel in one allocation process.

With reference to the second possible implementation manner of the third aspect, in a fourth possible implementation manner of the third aspect, after the reading each sublayer in the $m^{th}$ image segment by using each read channel allocated to each sublayer, the method further includes: when another sublayer, except an already read sublayer, in a layer to which the already read sublayer in the $m^{th}$ image segment belongs is already read, releasing a read channel allocated to the already read sublayer in the $m^{th}$ image segment; or when there is another unread sublayer, except an already read sublayer, in a layer to which the already read sublayer in the $m^{th}$ image segment belongs, continuing to read the another unread sublayer by using a read channel allocated to the already read sublayer in the $m^{th}$ image segment.

It can be learned from the foregoing technical solutions that the embodiments of the present invention have the following advantages.

In the embodiments of the present invention, two coordinates corresponding to two boundaries that are of each layer in multiple layers of an image frame and that are in a direction of a first coordinate axis are first obtained, and multiple coordinates corresponding to the multiple layers can be obtained. Then, the image frame is divided into at least two image segments in the direction of the first coordinate axis by using the multiple coordinates. Two boundaries of any image segment correspond to two neighboring coordinates in the multiple coordinates, the any image segment includes a part that is in at least one layer and that falls within an interval at which the image segment is located, and a part that is in any layer and that falls within the interval at which the image segment is located is a sublayer of the any layer. Next, the at least two image segments are read along the direction of the first coordinate axis in a time-division manner and according to a scanning sequence. Finally, image synthesis is successively performed on the at least two image segments according to a time sequence of reading the at least two image segments in the time-division manner, so as to generate display data, where image synthesis for an image segment includes image synthesis for all sublayers that are included in the image segment. In the embodiments of the present invention, because the image frame is divided into the at least two image segments, the image frame is also read in the time-division manner and according to the image segments, and when image synthesis is finally performed, the image segments are also synthesized segment-by-segment according to the time sequence of reading the at least two image segments, and multiple pieces of display data can be generated, where the generated display data can be directly displayed. Because each layer of the image frame in the embodiments of the present invention is divided into multiple sublayers according to intervals at which the image segments are located, after an image segment is completely divided, the image segment can be read in time to perform image synthesis, so that image synthesis efficiency in the embodiments of the present invention can be improved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons skilled in the art may still derive other drawings from these accompanying drawings.

DETAILED DESCRIPTION OF ILLUSTRATIVE EMBODIMENTS

Embodiments of the present invention provide an image synthesis method, an image chip, and an image device, so as to improve processing efficiency of image synthesis.

To make the embodiment objectives, features, and advantages of the present embodiments clearer and more comprehensible, the following describes the technical solutions in the embodiments of the present invention with reference to the accompanying drawings in the embodiments of the present invention. Apparently, the embodiments described in the following are merely a part rather than all of the embodiments of the present invention. All other embodiments obtained by persons skilled in the art based on the embodiments of the present invention shall fall within the protection scope of the present embodiments.

In the specification, claims, and accompanying drawings of the present invention, the terms "first," "second," and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present invention. In addition, the terms "include," "contain" and any other variants mean to cover the non-exclusive inclusion, so that a process, method, system, product, or device that includes a series of units is not necessarily limited to those units, but may include other units not expressly listed or inherent to such a process, method, system, product, or device.

Embodiment 1

Figure 1:
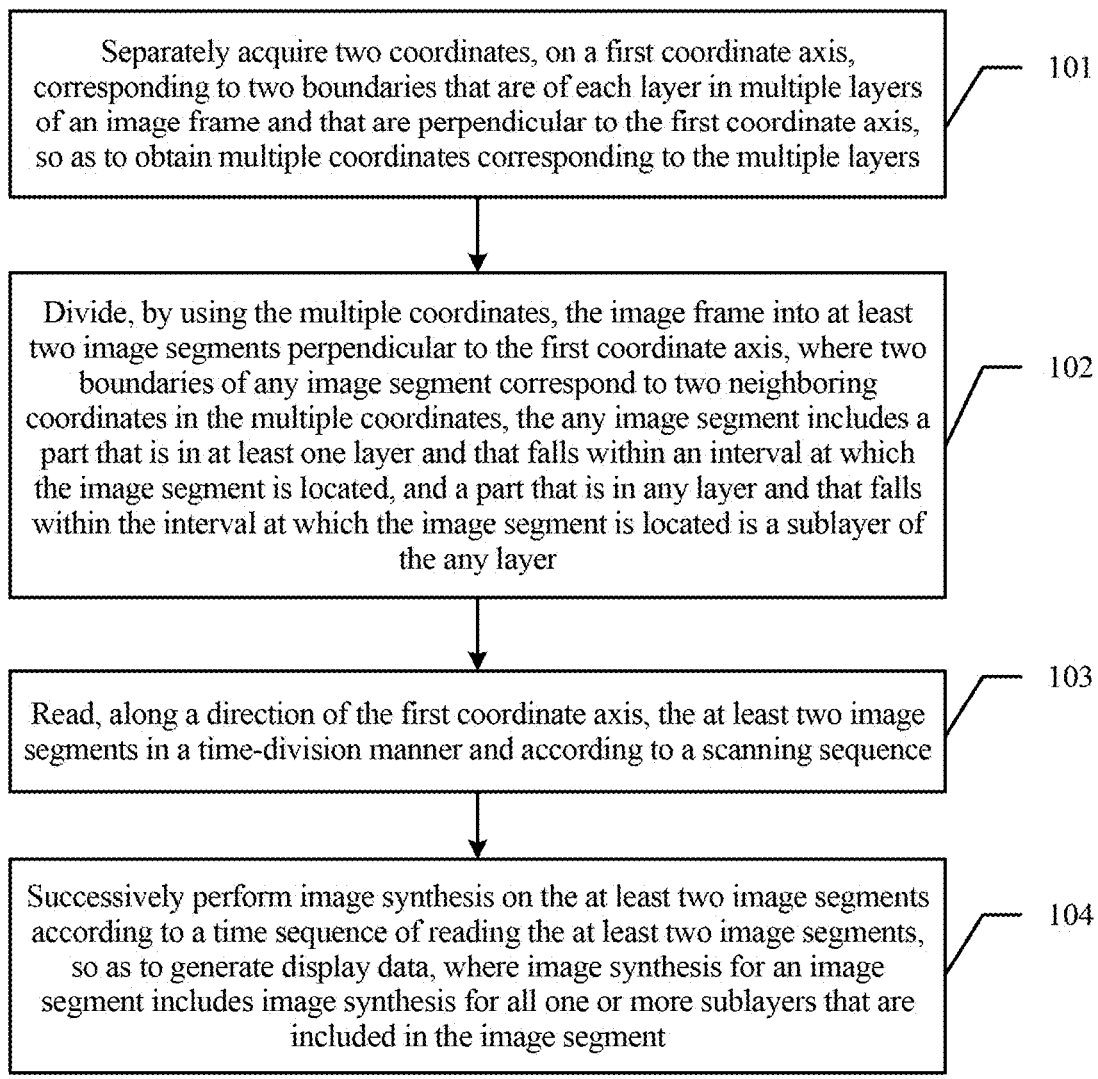
FIG. 1 is a flowchart of an image synthesis method according to an embodiment of the present invention.

As shown in FIG. 1, an embodiment of the present invention provides an image synthesis method that may be applied to a scenario such as image synthesis processing. The image synthesis method may include the following steps.

101. Obtain two coordinates, on a first coordinate axis, corresponding to two boundaries that are of each layer in multiple layers of a to-be-displayed image frame and that are perpendicular to the first coordinate axis, so as to obtain multiple coordinates corresponding to the multiple layers.

Persons skilled in the art should know that, when the to-be-displayed image frame is displayed on a terminal screen, all layers included in the image frame need to be synthesized for display because the image frame is generally obtained by overlapping multiple layers. In this embodiment of the present invention, when a coordinate system including the first coordinate axis is used as a reference system, each layer in the to-be-displayed image frame has two boundaries perpendicular to the first coordinate axis, and each boundary corresponds to one coordinate on the first coordinate axis. The first coordinate axis may specifically refer to a directional axis in a different coordinate system. A plane coordinate system is used as an example, and the first coordinate axis may be a horizontal axis (which is also referred to as an X axis), or may be a vertical axis (which is also referred to as a Y axis). An example in which the first coordinate axis is the vertical axis is used, for boundaries, of each layer, perpendicular to a direction of the vertical axis, there is a corresponding top coordinate and bottom coordinate, and a part that is of a layer and between two boundaries separately corresponds to coordinates between a top coordinate and a bottom coordinate. It should be noted that the layer involved in this embodiment may be a rectangular layer, and the two boundaries perpendicular to the first coordinate axis herein are two sides that are in a rectangular layer and that are perpendicular to the first coordinate axis. For a similar expression in the following, reference may be made to the explanation herein, and details are not described in the following for brevity. It should be known that both a top coordinate and a bottom coordinate of each layer are described in a case in which the first coordinate axis is selected as the vertical axis. In this embodiment of the present invention, a "top coordinate" of a layer may be also referred to as an "upper coordinate," and a "bottom coordinate" of the layer may be also referred to as a "lower coordinate," where both "upper and lower" and "top and bottom" are relative and used for describing coordinate values of two start and end boundaries that are of a layer and in the direction of the vertical axis. In some application scenarios of the present invention, if the terminal screen is placed in a landscape orientation, a "top coordinate" and a "bottom coordinate" of a layer may be further referred to as a "left coordinate" and a "right coordinate," a "right coordinate" and a "left coordinate," or the like. Alternatively, if the first coordinate axis is the horizontal axis, two boundaries, of a layer, in a direction of the horizontal axis also correspond to a "left coordinate" and a "right coordinate" respectively.

It should be noted that an image displayed on the terminal screen may be generally obtained by overlapping and synthesizing multiple windows displayed by multiple application programs, that is, one frame of image displayed on the terminal screen is obtained by overlapping and synthesizing layers corresponding to windows. The terminal screen always successively displays each layer according to a scanning sequence. For example, when a scanning manner of the terminal screen is progressive scanning from top to bottom, content of a part corresponding to a top coordinate of a layer may be first displayed, and content of a part corresponding to a bottom coordinate of the layer is finally displayed.

In this embodiment of the present invention, to implement image synthesis, an image chip first needs to obtain all layers that are in the to-be-displayed image frame and that need to be displayed on the terminal screen, and then obtains coordinates corresponding to boundaries, of each layer, in a direction of the first coordinate axis. It can be learned from the foregoing content description that each layer has two boundaries in the direction of the first coordinate axis. For example, the two boundaries of each layer correspond to one top coordinate and one bottom coordinate. After the image chip obtains multiple coordinates corresponding to two boundaries of all the layers that need to be displayed, optionally, the image chip may sort the multiple coordinates corresponding to the two boundaries of all the layers. Specifically, the sorting needs to be performed on the basis of the selected first coordinate axis and according to coordinate values, where the sorting may be performed according to the coordinate values in descending order, or may be performed according to the coordinate values in ascending order. After the multiple coordinates (for example, top coordinates and bottom coordinates) corresponding to the two boundaries of all the layers are sorted, multiple coordinates whose values are in ascending order or descending order may be obtained.

In this embodiment of the present invention, when an example in which the first coordinate axis is the vertical axis in the plane coordinate system is used, the sorting performed by the image chip on the two coordinates corresponding to the two boundaries of all the layers in the to-be-displayed image frame may specifically include the following steps.

A1. Separately obtain a top coordinate and a bottom coordinate corresponding to two boundaries of each layer that needs to be displayed.

A2. Sort all the obtained top coordinates and bottom coordinates.

Figure 2A:
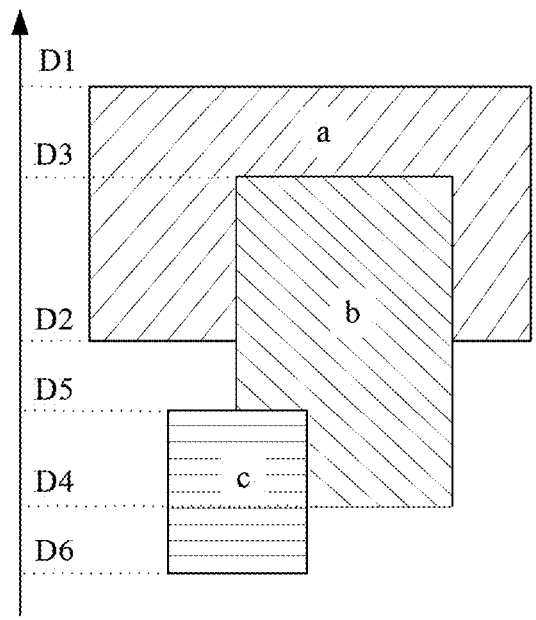
FIG. 2a is a schematic diagram of layer synthesis according to an embodiment of the present invention.
Figure 2B:
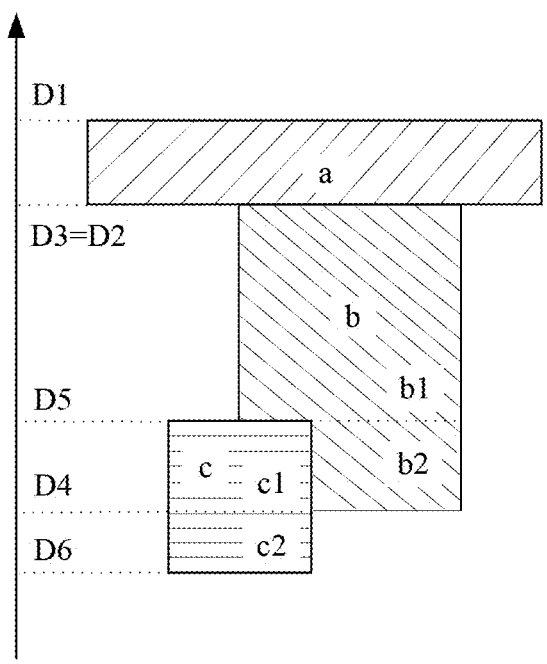
FIG. 2b is a schematic diagram of another layer synthesis according to an embodiment of the present invention.

The image chip first obtains a top coordinate and a bottom coordinate of each layer in all the layers that need to be displayed, that is, the top coordinate and the bottom coordinate of each layer are first obtained. In this way, all top coordinates and all bottom coordinates of all the layers can be obtained, and then all the top coordinates and all the bottom coordinates are sorted, so as to obtain multiple coordinates whose values are in ascending order or descending order. As shown in FIG. 2a, there are three layers in total that are in the to-be-displayed image frame and that need to be displayed, which are respectively a layer a, a layer b, and a layer c, where the layer a is a box filled with rightward slashes, the layer b is a box filled with leftward slashes, and the layer c is a box filled with horizontal lines. The layer a and the layer b that are shown in the plane graph are not complete due to an overlapped area between the layers. Persons skilled in the art should know that a complete layer a should include a part of overlapped area between the layer a and the layer b, and similarly, a complete layer b should include the part of overlapped area between the layer a and the layer b. For a schematic diagram, on a same plane, of multiple layers in an image frame involved in a subsequent embodiment of the present invention, reference may be made to the description herein. Each layer has a top coordinate and a bottom coordinate. If two boundaries of the layer a respectively correspond to a top coordinate D1 and a bottom coordinate D2, two boundaries of the layer b respectively correspond to a top coordinate D3 and a bottom coordinate D4, and two boundaries of the layer c respectively correspond to a top coordinate D5 and a bottom coordinate D6, and it is assumed that values of the coordinates are different from each other, the six coordinates are sorted according to the coordinate values. In this way, a string of six coordinates whose values are in ascending order or descending order can be obtained. It is assumed that D1>D3>D2>D5>D4>D6, an obtained string of six coordinates whose values successively change is: D1, D3, D2, D5, D4, and D6. If there are layers that have a same boundary, that is, respective boundaries of at least two layers correspond to a same top coordinate or bottom coordinate, only one coordinate thereof is selected for sorting. For example, as shown in FIG. 2b, if a bottom coordinate of the layer a is the same as a top coordinate of the layer b, that is, D3=D2, five coordinates that are obtained after being sorted and whose values successively change in descending order should be: D1, D3 (D2), D5, D4, and D6.

In addition to the sorting manner described above, other implementation manners may be also used in some other embodiments of the present invention. For example, all top coordinates of layers in a to-be-displayed image frame may be first obtained, and then all the top coordinates of the layers are sorted. Then, all bottom coordinates of the layers are obtained, all the bottom coordinates of the layers are sorted, and a result of the sorting performed according to the bottom coordinates is inserted into a result of the sorting performed according to the top coordinates. In some other embodiments of the present invention, top coordinates and bottom coordinates of any two layers in all layers that need to be displayed may be first obtained, and then the obtained top coordinates and bottom coordinates are sorted. Next, a top coordinate and a bottom coordinate of another layer in the layers that need to be displayed are obtained and inserted into an original sorting result until a top coordinate and a bottom coordinate of the last layer are obtained, and the top coordinate and the bottom coordinate of the last layer are inserted into an original sorting result. For previously listed multiple coordinates whose coordinate values are the same, only one coordinate thereof is selected and added to the sorting result.

To facilitate better understanding and implementation of the foregoing solutions in this embodiment of the present invention, detailed description is provided in the following for a corresponding application scenario.

Figure 3:
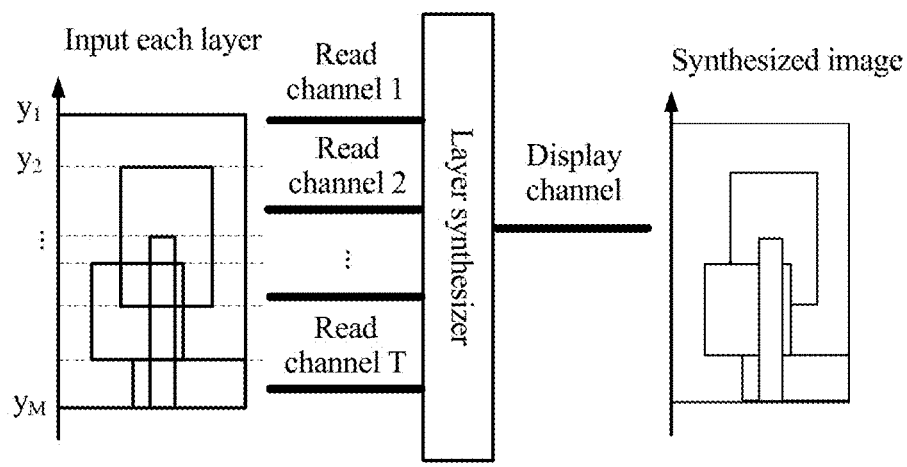
FIG. 3 is a schematic diagram of layer processing by using an image synthesis method according to an embodiment of the present invention.

Referring to FIG. 3, FIG. 3 is a schematic diagram of a layer processing process by using an image synthesis method according to an embodiment of the present invention. In FIG. 3, the image chip may include a layer synthesizer, including read circuits of T read channels and a processor, configured to perform image segment division on each layer input into the image chip, where the processor is not shown herein. The layer synthesizer reads, by using the T read channels, each layer that is in an image frame and that needs to be displayed, then performs image synthesis, and outputs, by using a display channel, a synthesized image to the terminal screen for display, where T is a non-zero natural number, and the T read channels may be respectively marked as a read channel 1, a read channel 2, . . . , and a read channel T. Description is provided herein by using the vertical axis (y axis) in the plane coordinate system as the first coordinate axis. Step 101 may further include the following steps.

1011. Perform sorting according to top coordinates and bottom coordinates of all the layers, and if there are M sorted coordinates in total whose values are in ascending order or descending order, and M is a non-zero natural number, the coordinate values of the M sorted coordinates are respectively y1, y2, . . . , and yM, which constitute (M−1) coordinate intervals in total, that is, (y1, y2), (y1, y2), . . . , and (y M−1, y M−2) respectively.

Figure 4A:
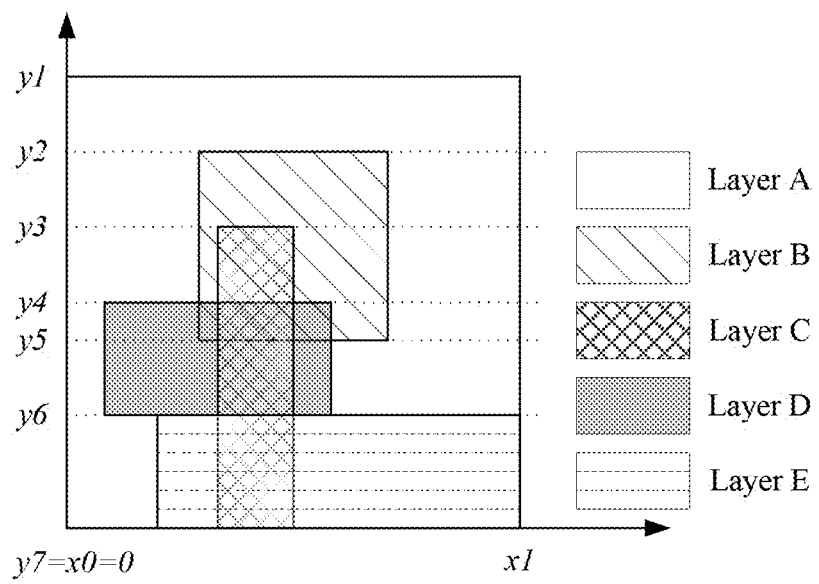
FIG. 4a is a schematic diagram of multiple layers input into an image chip according to an embodiment of the present invention.

As shown in FIG. 4a, an example in which the image frame includes five layers is used, where the five layers are respectively a layer A, a layer B, a layer C, a layer D, and a layer E. In the figure, the layer A is represented by a blank box, a top coordinate of the layer A is y1, and a bottom coordinate of the layer A is y7; the layer B is represented by a box filled with rightward slashes, a top coordinate of the layer B is y2, and a bottom coordinate of the layer B is y5; the layer C is represented by a box filled with grid lines, a top coordinate of the layer C is y3, and a bottom coordinate of the layer C is y7; the layer D is represented by a gray box, a top coordinate of the layer D is y4, and a bottom coordinate of the layer D is y6; the layer E is represented by a box filled with dashed lines, a top coordinate of the layer E is y6, and a bottom coordinate of the layer E is y7. The top coordinates and the bottom coordinates of all the layers are sorted to obtain a sorting result: y1, y2, . . . , and y7. It should be known that, in FIG. 4a, transparency processing is performed on each layer to show integrity of each layer. For an overlapped area between any two layers or among multiple layers, a filling line and/or a filling color are/is mixed with respective filling lines and/or filling colors of the layers. It should be noted that step 1011 is only an optional implementation manner during specific implementation of the image synthesis method provided in this embodiment of the present invention. Whether the obtained multiple coordinates in step 101 are further processed so as to facilitate subsequent implementation of step 102 is not particularly limited in the present embodiments.

102. Divide, by using the multiple coordinates, the to-be-displayed image frame into at least two image segments perpendicular to the first coordinate axis, where two boundaries of any image segment correspond to two neighboring coordinates in the multiple coordinates, the any image segment includes a part that is in at least one layer and that falls within an interval at which the image segment is located, and a part that is in any layer and that falls within the interval at which the image segment is located is a sublayer of the any layer.

In this embodiment of the present invention, after the image chip obtains the multiple coordinates corresponding to the multiple layers in the to-be-displayed image frame, multiple coordinate intervals may be obtained according to values of the multiple coordinates, and the image frame is divided into multiple corresponding image segments according to the multiple coordinate intervals. A coordinate interval is constituted by two neighboring coordinates, and each image segment includes all sublayers that are in the image frame and that fall within a range of a coordinate interval corresponding to the image segment. For example, for P coordinates whose values are in ascending order or descending order, where P is a non-zero natural number, if the coordinate values of the P coordinates are not repetitive, the P coordinates can constitute (p−1) coordinate intervals. Referring to FIG. 2b, an example in which the to-be-displayed image frame includes three layers and the first coordinate axis is the vertical axis is used. Each layer has two boundaries in the direction of the first coordinate axis, each boundary corresponds to one coordinate, and there are six coordinates in total. Because the bottom boundary of the layer a is the same as the top boundary of the layer b, five coordinates obtained after deduplication is performed on values of the six coordinates are sorted as D1>D3 (D2) >D5>D4>D6, and (D1, D3), (D3, D5), (D5, D4), and (D4, D6) are each a pair of neighboring coordinates. The image frame may be divided into four image segments according to the four pairs of neighboring coordinates. For example, the layer a falling within (D1, D3) is added to an image segment, a sublayer b1 that is in the layer b and that falls within (D3,D5) is added to another image segment, a sublayer b2 that is in the layer b and that falls within (D5, D4) and a sublayer c1 that is in the layer c and that falls within (D5, D4) are added to the third image segment, and a sublayer c2 that is in the layer c and that falls within (D4, D6) is added to the fourth image segment.

It should be noted that, in this embodiment of the present invention, although the at least two image segments are obtained by division based on the coordinate of each boundary, in the direction of the first coordinate axis, of each layer in the to-be-displayed image frame, it can be understood that both the to-be-displayed image frame and any image segment generally need to be represented by using a two-dimensional coordinate system. The two-dimensional coordinate system may be constituted by the first coordinate axis and a second coordinate axis that are perpendicular to each other. A boundary, of any image segment obtained by division, in a direction of the second coordinate (that is, perpendicular to the second coordinate axis) is the same as a boundary, of the to-be-displayed image frame, in the direction of the second coordinate axis. FIG. 4a is used as an example, where the first coordinate axis is a y axis, and the second coordinate axis is an x axis. Coordinates of two boundaries, of any image segment, in a direction of the x axis are equal to coordinates on the x axis, that is, x0 and x1, of two boundaries that are of the to-be-displayed image frame and that are perpendicular to the x axis. Subsequent embodiments all comply with this stipulation, and details will not be described.

It should be noted that, in this embodiment of the present invention, one layer may be entirely divided into one sublayer, or may be divided into multiple sublayers. The sublayers obtained by division still belong to one layer. Division of an original layer in this embodiment of the present invention is to spread one layer to one or more image segments, and then successively read all sublayers included in each image segment to perform image synthesis. In addition, in a reading process, a data reading resource may be configured for a sublayer in a layer segment-by-segment according to an image segment reading sequence. For how to configure a data reading resource for an image segment that is formed after layer division, refer to subsequent embodiment description.

The foregoing FIG. 3 and FIG. 4a are still used as an example for description, and step 102 may specifically include the following steps.

1021. Divide all layers that need to be displayed into multiple sublayers according to all sorted y coordinates, so as to divide the to-be-displayed image frame into the at least two image segments.

FIG. 4a is used as an example. For the layer A, according to two neighboring coordinates y1 and y2, two neighboring coordinates y2 and y3, two neighboring coordinates y3 and y4, two neighboring coordinates y4 and y5, two neighboring coordinates y5 and y6, and two neighboring coordinates y6 and y7, the layer A may be divided into six sublayers, which are respectively y1-y2, y2-y3, y3-y4, y4-y5, y5-y6, and y6-y7, the layer B is divided into three sublayers, which are respectively y2-y3, y3-y4, and y4-y5, the layer C is divided into four sublayers, which are respectively y3-y4, y4-y5, y5-y6, and y6-y7, the layer D is divided into two sublayers, which are respectively y4-y5 and y5-y6, and the layer E is divided into one sublayer, that is, y6-y7.

1022. Add, to one image segment, sublayers that are in the multiple sublayers and that separately correspond to same two neighboring coordinates, so as to obtain the at least two image segments.

Correspondingly, as shown in FIG. 4a, an image segment located between the two neighboring coordinates y1 and y2 only includes a first sublayer of the layer A, an image segment located between the two neighboring coordinates y2 and y3 includes a second sublayer of the layer A and a first sublayer of the layer B, an image segment located between the two neighboring coordinates y3 and y4 includes a third sublayer of the layer A, a second sublayer of the layer B, and a first layer of the layer C, an image segment located between the two neighboring coordinates y4 and y5 includes a fourth sublayer of the layer A, a third sublayer of the layer B, a second sublayer of the layer C, and a first sublayer of the layer D, an image segment located between the two neighboring coordinates y5 and y6 includes a fifth sublayer of the layer A, a third sublayer of the layer C, and a second sublayer of the layer D, and an image segment located between the two neighboring coordinates y6 and y7 includes a sixth sublayer of the layer A, a fourth sublayer of the layer C, and a first sublayer of the layer E. That is, sublayers that are of all the layers and that fall within a same coordinate interval constitute one image segment; for a sublayer included in each image segment, reference may be further made to FIG. 2b and corresponding embodiment description, and details are not described herein. It should be known that "first" and "second" used for describing the sublayers of the layers are for ease of description and are distinguished according to top-to-bottom sorting of the sublayers on the vertical axis.

103. Read, along a direction of the first coordinate axis, the at least two image segments in a time-division manner and according to a scanning sequence.

In this embodiment of the present invention, because image segment division is performed along the direction of the first coordinate axis, the image chip reads, along the direction of the first coordinate axis, the at least two image segments in the time-division manner and according to the scanning sequence. Reading in the time-division manner is reading the at least two image segments at different times. That is, in this embodiment of the present invention, when scanning the image frame, the image chip performs scanning according to a particular scanning sequence. Based on a difference in selection of the foregoing first coordinate axis, the image chip may perform scanning from top to bottom, or may perform scanning from bottom to top, or may perform scanning from left to right, or may perform scanning from right to left. Persons skilled in the art should know that an existing display generally performs scanning in a progressive scanning manner. Generally, progressive scanning is performed from top to bottom and starts from the first row in an upper left corner of a screen. Each row may be considered as one scanning line, and a display screen may be divided into multiple scanning lines along a horizontal direction. When performing display, according to the scanning sequence, the terminal screen may display, within a time, an image segment corresponding to a scanning line for which progressive scanning is completed first, and display, within a next time, an image segment corresponding to a scanning line for which progressive scanning is completed later. It can be learned that the time-division manner is used for both the image chip to scan the image frame and the terminal screen to display the image frame. Therefore, when reading the at least two image segments in the image frame, the image chip may also read the at least two image segments in the time-division manner and according to the scanning sequence of the scanning line of the terminal screen.

In this embodiment of the present invention, the image chip may obtain the at least two image segments in the time-division manner. Because all coordinate values, on the first coordinate axis, of multiple sublayers within a same image segment are between a same pair of neighboring coordinates, and the sublayers of the same image segment need to be simultaneously or continuously displayed on the terminal screen, the image chip needs to place these simultaneously or continuously displayed sublayers to one image segment for reading.

In some embodiments of the present invention, step 103 may specifically include: along the direction of the first coordinate axis and according to the scanning sequence, reading each sublayer in a first image segment at a first time, and reading each sublayer in an $n^{th}$ image segment at an $n^{th}$ time; and repeating this step until n is equal to N, where n is an integer greater than or equal to 2, and N is a quantity of image segments included in the at least two image segments.

That is, N image segments may be read at N moments. At the first time, each sublayer of the first image segment is read, and at another time, each sublayer in an image segment corresponding to the another time is read. For example, at the $n^{th}$ time, each sublayer in the $n^{th}$ image segment is read. This step is repeated until n is equal to N, and a value of n is 2, 3, 4, 5, and the like until each sublayer in an $N^{th}$ image segment is read at an $N^{th}$ time, where "first" image segment and "$N^{th}$" image segment are sorted according to the scanning sequence.

It should be noted that the to-be-displayed image frame is processed with a unit of a single layer in a current technology, and therefore, in the current technology, image synthesis can be performed only after all layers are completely read in. In this embodiment of the present invention, the to-be-displayed image frame is not processed with a unit of a single layer, but with a unit of a sublayer. The sublayer is obtained after the layer is divided according to two neighboring coordinates, and sublayers between same two neighboring coordinates belong to an image segment. In this embodiment of the present invention, image synthesis may be no longer executed in an off-line mode in the current technology; instead, when step 103 of reading, along a direction of the first coordinate axis, the at least two image segments in a time-division manner and according to a scanning sequence is being performed, step 104 can be performed each time one image segment is read, and is not required to be performed after all image segments are obtained. In this embodiment of the present invention, the manner of real-time reading and image synthesis is defined as an on-line mode. Before a frame of image starts to be displayed, sublayers that need to be displayed are configured on display channels. When the frame of image starts to be displayed, the display channels read pixel values from corresponding sublayers at the same time, and the read pixel values are synthesized and added up according to pixel locations to obtain a pixel value of each location on the terminal screen. Then, pixel values obtained after synthesis are directly displayed on the terminal screen, and in this case, there is a relatively strict time synchronization relationship between a moment for calculating the pixel values and a moment for displaying the pixel values.

The foregoing FIG. 3 and FIG. 4*a* are still used as an example for detailed description, and step 103 may specifically include the following steps.

1031. Each time all sublayers of an image segment are obtained by division, separately allocate all the sublayers in the image segment to read channels.

FIG. 4*a* is used as an example, and allocation may be performed in the following manner.

(1) Because the first image segment located between the neighboring coordinates y1-y2 only includes the first sublayer of the layer A, only the first sublayer of the layer A needs to be configured for a read channel 1 at a first time, and another read channel does not need to be occupied.

(2) Because the second image segment located between the neighboring coordinates y2-y3 includes the second sublayer of the layer A and the first sublayer of the layer B, at a second time, it is only required to configure the second sublayer of the layer A for the read channel 1 and the first sublayer of the layer B for a read channel 2, that is, only the two read channels need to be occupied within the second time, and another read channel does not need to be occupied.

(3) For the third image segment located between the neighboring coordinates y3-y4, because the image segment includes the third sublayer of the layer A, the second sublayer of the layer B, and the first sublayer of the layer C, at a third time, the third sublayer of the layer A may be configured for the read channel 1, the second sublayer of the layer B may be configured for the read channel 2, and the first sublayer of the layer C may be configured for a read channel 3, that is, only the three read channels need to be occupied within the third time, and another read channel does not need to be occupied.

(4) For the fourth image segment located between the neighboring coordinates y4-y5, because the fourth image segment includes the fourth sublayer of the layer A, the third sublayer of the layer B, the second sublayer of the layer C, and the first sublayer of the layer D, at a fourth time, the fourth sublayer of the layer A may be configured for the read channel 1, the third sublayer of the layer B may be configured for the read channel 2, the second sublayer of the layer C may be configured for the read channel 3, and the first sublayer of the layer D may be configured for a read channel 4, that is, only the four read channels need to be occupied within the fourth time, and another read channel does not need to be occupied.

(5) For the fifth image segment located between the neighboring coordinates y5-y6, because the fifth image segment includes the fifth sublayer of the layer A, the third sublayer of the layer C, and the second sublayer of the layer D, and there are only three sublayers within the fifth image segment, at a fifth time, the fifth sublayer of the layer A may be configured for the read channel 1, the third sublayer of the layer C may be configured for the read channel 3, and the second sublayer of the layer D may be configured for the read channel 4, that is, only the three read channels need to be occupied within the fifth time, and another read channel does not need to be occupied. It should be noted that, because there are three sublayers in total in the layer B, and the image synthesizer already completely reads the sublayers in the layer B by using the read channel 2 at the fifth time, the read channel 2 may be released to read a sublayer of another layer.

(6) For the sixth image segment located between the neighboring coordinates y6-y7, because the sixth image segment includes the sixth sublayer of the layer A, the fourth sublayer of the layer C, and the first sublayer of the layer E, at a sixth time, the sixth sublayer of the layer A may be configured for the read channel 1 and the fourth sublayer of the layer C may be configured for the read channel 3. It can be learned, according to the foregoing description, that the read channel 2 is already released and in an idle state at the sixth time. Therefore, the layer E may be further configured for the read channel 2. In this case, only the read channel 1, the read channel 2, and the read channel 3 are occupied, and another read channel does not need to be occupied.

It can be learned that, in the foregoing embodiment, a quantity of occupied read channels is different for a different image segment, and a specific quantity of read channels may be selected according to a need. In addition, in the foregoing embodiment, because the read channel 2 is idle after being allocated to the layer B, the layer E may be also configured for the read channel 2, so that sublayers of different layers are read by using one read channel within different times, so as to reduce a quantity of read channels. However, according to practice in the current technology, one read channel is generally configured for one layer, that is, if there are five layers, five read channels need to be used at the same time according to the practice in the current technology. However, image synthesis of the five layers can be implemented without a need to occupy the five read channels in this embodiment of the present invention, which reduces a quantity of read channels.

104. Successively perform image synthesis on the at least two image segments according to a time sequence of reading the at least two image segments in the time-division manner, so as to generate display data corresponding to the image frame, where image synthesis for an image segment includes image synthesis for all sublayers that are included in the image segment.

In this embodiment of the present invention, after one image segment in the at least two image segments is read by performing step 103, the image chip immediately starts to perform step 104 and performs image synthesis on sublayers in the read image segment, so as to generate display data.

Specifically, image synthesis for an image segment is image synthesis for all one or more sublayers within the image segment.

In some embodiments of the present invention, when performing, by performing step 104, image synthesis on the at least two images that are read in the time-division manner, the image chip first performs image synthesis on sublayers in an image segment that is first read, and later performs image synthesis on sublayers in an image segment that is later read.

In this embodiment of the present invention, when the image chip performs image synthesis on each image segment, the image chip may read a pixel value corresponding to each sublayer in an image segment. After reading all pixel values of an image segment, the image chip may perform combined calculation on all the read pixel values to generate display data corresponding to the image segment, where the display data is pixel values that can be combined on the terminal screen for display.

In this embodiment of the present invention, combined calculation performed by the image chip on multiple pixel values may be specifically implemented by adding up multiple pixel values at a same screen location according to a required proportion, where the proportion is required transparency for the two layers, and the transparency is probably from completely transparent to completely non-transparent. Image synthesis is implemented by adding up layer-by-layer, according to a corresponding proportion, pixel values of a part mutually covered by multiple layers, where a pixel value displayed on a part that is not covered by an upper layer is a pixel value of a lower layer. An example in which the to-be-displayed image frame is of an RGBA (Red Green Blue Alpha) format is used, where one layer covers another layer, a value of A (abbreviation of Alpha) in an RGBA layer represents transparency, an RGB value represents values of three colors, that is, red, green, and blue, of a layer, and an eventually displayed color value is: RGB value of a current layer×a+RGB value of a lower layer×(1−a).

To better describe the technical solutions in the present embodiments, step 103 and step 104 are further illustrated in the following. In some embodiments of the present invention, if at least one read channel is configured in the image chip, at least one image segment may be read by using the read channel in the image chip. The read channel is a hardware resource configured in the image chip for data reading, and a specific implementation form of the read channel includes but is not limited to a bus, a data transmission line, a set of electronic components that have a reading capability, or the like. An image segment may be read by using the read channel, and a quantity of read channels configured in the image chip may be preset according to a need of image frame processing by the image chip. Exemplarily, there may be one or more read channels, which is not specifically limited in the present embodiments. After the quantity of read channels in the image chip is set, step 103 of reading, along a direction of the first coordinate axis, the at least two image segments in a time-division manner and according to a scanning sequence may specifically include the following steps.

C1. Separately allocate, among at least one read channel configured in the image chip and at an $m^{th}$ time, one read channel to each sublayer in an $m^{th}$ image segment, where m is any integer less than or equal to N, and N is the quantity of image segments included in the at least two image segments.

C2. Read each sublayer in the $m^{th}$ image segment by using each read channel allocated to each sublayer.

C3. Repeat the foregoing steps C1 and C2 until all image segments in the image frame are completely read.

In the foregoing embodiment, for N image segments, the image segments are respectively read at N moments, where the $m^{th}$ image segment may be any image segment in the N image segments, that is, a manner of reading the $m^{th}$ image segment by the image chip is also applicable to all the image segments. In step C1, the image chip allocates one read channel to each sublayer in the $m^{th}$ image segment, that is, one read channel is allocated to one sublayer when the sublayer is being read, and after the read channel is completely allocated to the sublayer, sublayer reading can be implemented by using the read channel for the sublayer to which the read channel is already allocated.

Correspondingly, step 104 may also specifically include the following step: performing image synthesis on all the sublayers, in the $m^{th}$ image segment, that are read by using the at least one read channel, so as to generate display data corresponding to the $m^{th}$ image segment.

That is, for the $m^{th}$ image segment, after all the sublayers in the $m^{th}$ image segment are completely read, image synthesis can be performed on all the read sublayers to generate the display data corresponding to the $m^{th}$ image segment, and further, the display data is displayed on the terminal screen. Because generation of display data of each image segment is consistent with the scanning sequence, reading and image synthesis for the $m^{th}$ image segment may be considered to be performed nearly at the same time, and it is not required to perform image synthesis only after an $(m+1)^{th}$ image segment, an $(m+2)^{th}$ image segment, and the like are completely read, to generate display data. Persons skilled in the art should know that, because reading and image synthesis for each image segment in the image frame and image frame scanning are performed nearly at the same time or keep synchronous, as long as frequency of image frame scanning is controlled, it can be ensured that an image is continuous in terms of human visual sense, where the image is formed when display data that is obtained after image synthesis is separately performed on all image segments is displayed on the terminal screen.

Further, for the foregoing step C1, there may be two specific implementation manners, which are described in detail in the following.

C11. When a quantity of all sublayers in the $m^{th}$ image segment is less than or equal to a quantity of read channels in the at least one read channel, allocate all the sublayers in the $m^{th}$ image segment to the at least one read channel at the $m^{th}$ time, where one unique sublayer is allocated to one read channel at the $m^{th}$ time.

C12. When a quantity of all sublayers in the $m^{th}$ image segment is greater than a quantity of read channels in the at least one read channel, allocate all the sublayers in the $m^{th}$ image segment to the at least one read channel at several times within the $m^{th}$ time, where one sublayer is allocated to one read channel in one allocation process.

For the implementation manner in step C11, when the quantity of sublayers in the $m^{th}$ image segment is less than or equal to the quantity of read channels in the image chip, it means that the read channels can satisfy needs of all the sublayers in the $m^{th}$ image segment, the image chip can allocate read channels to all the sublayers in the $m^{th}$ image segment at the same time, and only one sublayer needs to be allocated to each read channel. Allocating the read channels at the same time means allocating multiple read channels in the image chip to all the sublayers in the $m^{th}$ image segment at a time, all the sublayers in the $m^{th}$ image segment can each obtain one read channel by means of one time of allocation, and for all the sublayers in the $m^{th}$ image segment, data reading can be completed at a time using the allocated read channels.

For the implementation manner in step C12, when the quantity of sublayers in the $m^{th}$ image segment is greater than the quantity of read channels in the image chip, it means that the read channels in the image chip cannot satisfy needs of all the sublayers in the $m^{th}$ image segment, the image chip needs to allocate read channels to all the sublayers in the $m^{th}$ image segment at several times, and one sublayer is allocated to each read channel in one allocation process. Allocating the read channels to the sublayers in the $m^{th}$ image segment at several times means that separately allocating one read channel to all the sublayers in the $m^{th}$ image segment is not completed at a time, but completed at least two times, all the sublayers in the $m^{th}$ image segment can obtain one read channel by means of multiple times of allocation, and for all the sublayers in the $m^{th}$ image segment, data reading can be completed at several times by using the allocated read channels. The read channel is a physical resource used when data at each layer is read, a specific implementation form of the read channel may include a bus, a data transmission line, or another hardware resource that is configured in the image chip and that has a reading capability, and an image segment can be read by using the read channel. For example, if only three read channels are configured in the image chip, and there are seven sublayers in the $m^{th}$ image segment, for example, including sublayers such as m1, m2, m3, m4, m5, m6, and m7, the image chip needs to allocate the seven sublayers to the read channels at least three times for reading. In the first time of allocation, the three read channels may be configured for three sublayers (m1, m2, and m3) in the $m^{th}$ image segment, and data of the three sublayers is first read by using the three read channels. After the data of the three sublayers is completely read, the three read channels are then configured for other three sublayers (m4, m5, and m6) in the $m^{th}$ image segment, and data of the other three sublayers is read by using the three read channels. Finally, any read channel in the three read channels is allocated to the remaining last sublayer (m7) in the $m^{th}$ image segment, and data of the last sublayer is read by using the read channel, thereby completing reading for all the sublayers in the $m^{th}$ image segment. It should be noted that, in this implementation manner, several sublayers such as m1, m2, m3, m4, m5, and m6 are first read, a storage medium is generally required for caching, and then image synthesis is performed on the first read six sublayers together with the sublayer m7 that is last read.

In this embodiment of the present invention, to improve image synthesis efficiency and reduce a waiting time, a corresponding quantity of read channels may be configured in the image chip generally according to a maximum quantity of sublayers that may be included in any image segment, so that a sublayer reading process can be implemented according to the implementation manner in C11 in which all sublayers in an image segment are concurrently read by means of one time of allocation. In this way, a time for interacting with a storage medium is saved, which improves image synthesis efficiency.

In some other embodiments of the present invention, based on the foregoing implementation manners of step C1 and step C2, the image synthesis method provided in this embodiment of the present invention may further include the following steps: when another sublayer, except an already read sublayer, in a layer to which the already read sublayer in the $m^{th}$ image segment belongs is already read, release a read channel allocated to the already read sublayer in the $m^{th}$ image segment; or when there is another unread sublayer, except an already read sublayer, in a layer to which the already read sublayer in the $m^{th}$ image segment belongs, continue to read the another unread sublayer by using a read channel allocated to the already read sublayer in the $m^{th}$ image segment.

That is, in the foregoing embodiment, an already read sublayer and another unread sublayer that are in a layer are added to different image segments, but the foregoing sublayers still belong to a same layer. In this way, the "already read sublayer" and the "another unread sublayer" belong to different image segments. Therefore, the "already read sublayer" and the "another unread sublayer" are not displayed on the terminal screen at the same time, and the "already read sublayer" and the "another unread sublayer" may use a same read channel. Therefore, in some embodiments of the present invention, for multiple groups of image segments located between different two neighboring coordinates, if some image segments thereof belong to a same layer, one read channel may be fixedly allocated to the multiple image segments that belong to the same layer. After an already read sublayer is completely read by using a read channel allocated to the sublayer, if other sublayers belonging to a same layer are all completely read, the read channel allocated to the layer does not need to be reserved, but the read channel can be released, so that the image chip allocates the read channel to a sublayer in another layer for use. Releasing the read channel is releasing a corresponding hardware reading resource, so that the read channel continues to be used for reading another sublayer, and the released read channel is in an idle state and may continue to be invoked, which implements read channel reuse. Different from the foregoing implementation manner, when there is the another unread sublayer, except the already read sublayer, in the layer to which the already read sublayer in the $m^{th}$ image segment belongs, it means that the layer needs to continue to use the read channel. Therefore, the read channel used when the already read sublayer is read may be reserved, so as to continue to read the another unread sublayer in the layer. That is, if multiple sublayers belong to a same layer, one read channel may be fixedly allocated to these sublayers belonging to a same layer. The read channel does not need to be released after an image segment is completely processed, and the read channel may continue to be reserved for another sublayer in the same layer. In this way, read channel utilization efficiency can be improved, and frequent configuration and release of a read channel can be avoided, thereby improving read channel configuration efficiency.

According to the foregoing implementation manner description, it should be noted that only a one-to-one correspondence between a sublayer and a read channel is implemented in this embodiment of the present invention, there is no fixed binding relationship between the read channel and the sublayer, and a same read channel may be used for different image segments, so that the read channel can be reused. For use of a read channel, a quantity of read channels is selected according to a quantity of sublayers within a different image segment in this embodiment of the present invention, and "on-demand use" can be implemented in this embodiment of the present invention, which avoids unnecessary occupation of a read channel and alleviates a problem, of high instantaneous occupation consumption of bus bandwidth, that exists when all read channels are in use. If a quantity of sublayers of an image segment is extremely small, occupied read channels also decrease accordingly, and it is unnecessary that each read channel corresponds to one layer. In this embodiment of the present invention, a case in which each layer occupies the full terminal screen generally does not occur, and a layer generally occupies only a part of the terminal screen. In this way, a case in which a layer in an image segment is divided into only one sublayer may occur. Therefore, only one read channel needs to be configured for the layer, and after the image segment is completely read, the read channel allocated to the foregoing layer may be further released and used by another layer, thereby greatly reducing read channel occupation.

It should be noted that, with reference to the foregoing FIG. 3 and FIG. 4a, when starting synthesized display, the layer synthesizer reads, from top to bottom according to a scanning sequence and before each segment is displayed, data of each sublayer in an image segment segment-by-segment for combined calculation, and the display performs display.

Figure 4B:
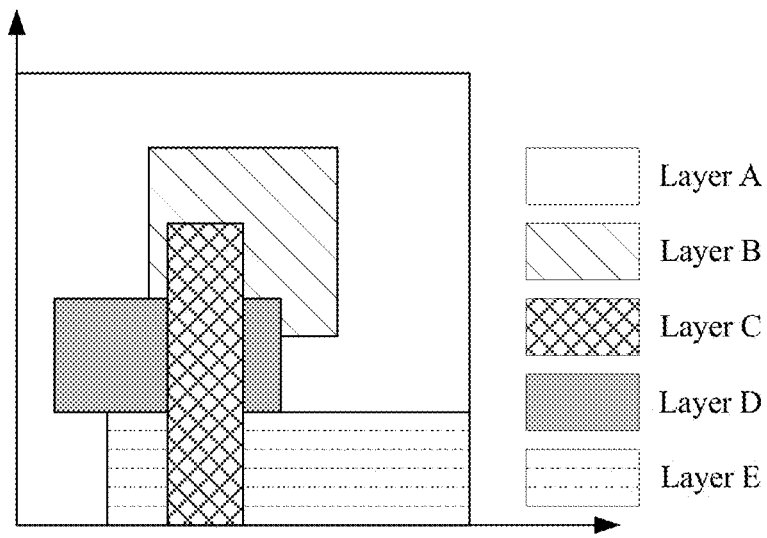
FIG. 4b is a schematic diagram of an image that is obtained by means of synthesis by using multiple layers and that is displayed on a terminal screen according to an embodiment of the present invention.

Combined calculation performed on multiple pixel values may be specifically implemented by adding up multiple pixel values at a same screen location according to a required proportion, where the proportion is required transparency for the two layers, and the transparency is probably from complete transparent to complete non-transparent. Combined display of multiple layers is implemented by adding up layer-by-layer, according to a corresponding proportion, pixel values of a part that is mutually covered by the multiple layers, and a pixel value displayed on a part that is not covered by an upper layer is a pixel value of a lower layer. FIG. 4b is a schematic diagram of an image that is synthesized by multiple layers and that is displayed on a terminal screen according to an embodiment of the present invention. During image synthesis, a part mutually overlapped by the layer A, the layer B, the layer C, the layer D, and the layer E may be covered according to transparency.

It can be learned from the foregoing specific application scenario of this embodiment of the present invention that layers are gradually read segment-by-segment in a display process, but not read at the same time when the display process starts, which may reduce instantaneous occupation of bus bandwidth. If a layer does not occupy all segments on a y axis, a corresponding read channel is released after the layer is completely displayed. In this case, the read channel may be arranged for another layer that is still not displayed, which reduces read channel occupation.

It can be learned from the description of the present embodiments in the foregoing embodiment that, two coordinates corresponding to two boundaries that are of each layer in multiple layers of a to-be-displayed image frame and that are in a direction of a first coordinate axis are first obtained, and multiple coordinates corresponding to the multiple layers can be obtained; then, the to-be-displayed image frame is divided into at least two image segments in the direction of the first coordinate axis by using the multiple coordinates, where two boundaries of any image segment correspond to two neighboring coordinates in the multiple coordinates, the any image segment includes a part that is in at least one layer and that falls within an interval at which the image segment is located, and a part that is in any layer and that falls within the interval at which the image segment is located is a sublayer of the any layer; next, the at least two image segments are read along the direction of the first coordinate axis in a time-division manner and according to a scanning sequence; and finally, image synthesis is successively performed on the at least two image segments according to a time sequence of reading the at least two image segments in the time-division manner, so as to generate display data, where image synthesis for an image segment includes image synthesis for all sublayers that are included in the image segment. In this embodiment of the present invention, because the to-be-displayed image frame is divided into the at least two image segments, the image frame is also read in the time-division manner and according to the image segments, and when image synthesis is finally performed, the image segments are also synthesized segment-by-segment according to the time sequence of reading the at least two image segments, and multiple pieces of display data can be generated, where the generated display data can be directly displayed. Because each layer of the to-be-displayed image frame in this embodiment of the present invention is divided into multiple sublayers according to intervals at which the image segments are located, after an image segment is completely divided, the image segment can be read in time to perform image synthesis, so that image synthesis efficiency in this embodiment of the present invention can be improved.

It should be noted that, for ease of description, the foregoing method embodiments are expressed as a series of action combinations. However, persons skilled in the art should know that the present embodiments are not limited by the described action sequence because some steps may be performed in another sequence or at the same time according to the present embodiments. In addition, persons skilled in the art should also know that the embodiments described in the specification all belong to optional embodiments, and the related actions and modules are not necessary for the present embodiments.

To facilitate better implementation of the foregoing solutions in Embodiment 1 of the present invention, the following further provides related apparatuses configured to implement the foregoing solutions. It should be noted that, for related characteristics of subsequent apparatus embodiments, mutual reference may be made to characteristics of the foregoing method embodiment.

Embodiment 2

Figure 5A:
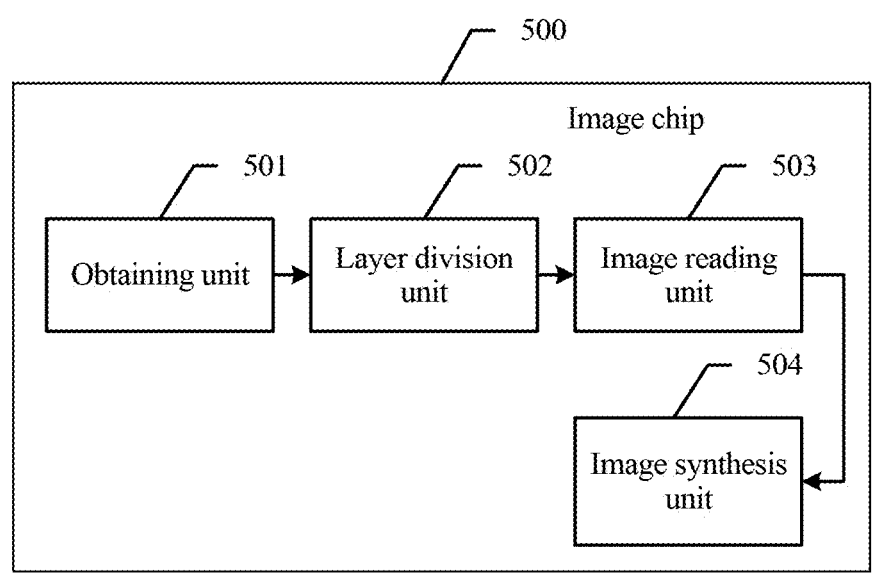
FIG. 5a is a schematic structural diagram of an image chip according to an embodiment of the present invention.

As shown in FIG. 5a, an image chip 500 that is used for image synthesis and is provided in this embodiment of the present invention may include: an obtaining unit 501, a layer division unit 502, an image reading unit 503, and an image synthesis unit 504.

The obtaining unit 501 is configured to separately obtain two coordinates, on a first coordinate axis, corresponding to two boundaries that are of each layer in multiple layers of a to-be-displayed image frame and that are perpendicular to the first coordinate axis, so as to obtain multiple coordinates corresponding to the multiple layers.

Persons skilled in the art should know that an image chip generally includes a memory or a cache, configured to store each layer of a to-be-displayed image frame, and is not shown in the figure for brevity.

The layer division unit 502 is configured to divide, by using the multiple coordinates, the image frame into at least two image segments perpendicular to the first coordinate axis, where two boundaries of any image segment correspond to two neighboring coordinates in the multiple coordinates, the any image segment includes a part that is in at least one layer and that falls within an interval at which the image segment is located, and a part that is in any layer and that falls within the interval at which the image segment is located is a sublayer of the any layer.

The image reading unit 503 is configured to read, along a direction of the first coordinate axis, in a time-division manner and according to a scanning sequence, the at least two image segments obtained by division by the layer division unit 502.

The image synthesis unit 504 is configured to successively perform image synthesis on the at least two image segments according to a time sequence in which the image reading unit 503 reads the at least two image segments in the time-division manner, so as to generate display data, where image synthesis for an image segment includes image synthesis for all sublayers that are included in the image segment.

In some embodiments of the present invention, the image reading unit 503 may be specifically configured to: along the direction of the first coordinate axis and according to the scanning sequence, read each sublayer in a first image segment at a first time, and read each sublayer in an $n^{th}$ image segment at an $n^{th}$ time; and repeat this step until n is equal to N, where n is an integer greater than or equal to 2, and N is a quantity of image segments included in the at least two image segments.

Figure 5B:
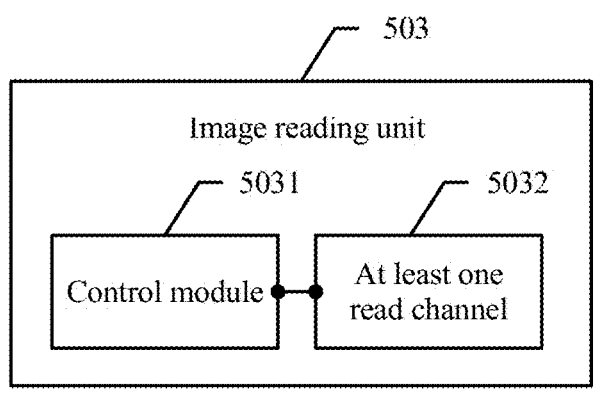
FIG. 5b is a schematic structural diagram of an image reading unit according to an embodiment of the present invention.

In some embodiments of the present invention, referring to FIG. 5b, the image reading unit 503 may include: a control module 5031 and at least one read channel 5032, where the control module 5031 is configured to separately allocate, among the at least one read channel 5032 and at an $m^{th}$ time, one read channel to each sublayer in an $m^{th}$ image segment obtained by division by the layer division unit, where m is any integer less than or equal to N, and N is the quantity of image segments included in the at least two image segments; and each read channel 5032 is configured to read one sublayer that is allocated by the control module 5031 to the read channel at the $m^{th}$ time.

In some embodiments of the present invention, the control module 5031 is specifically configured to: when a quantity of all sublayers in the $m^{th}$ image segment is less than or equal to a quantity of read channels in the at least one read channel, allocate all the sublayers in the $m^{th}$ image segment to the at least one read channel at the $m^{th}$ time, where one unique sublayer is allocated to one read channel at the $m^{th}$ time.

In some other embodiments of the present invention, the control module 5031 is specifically configured to: when a quantity of all sublayers in the $m^{th}$ image segment is greater than a quantity of read channels in the at least one read channel, allocate all the sublayers in the $m^{th}$ image segment to the at least one read channel at several times within the $m^{th}$ time, where one sublayer is allocated to one read channel in one allocation process.

In some embodiments of the present invention, the control module 5031 is further configured to: when another sublayer, except an already read sublayer, in a layer to which the already read sublayer in the $m^{th}$ image segment belongs is already read, release a read channel allocated to the already read sublayer in the $m^{th}$ image segment; or when there is another unread sublayer, except an already read sublayer, in a layer to which the already read sublayer in the $m^{th}$ image segment belongs, continue to read the another unread sublayer by using a read channel allocated to the already read sublayer in the $m^{th}$ image segment.

It can be learned from the foregoing description of this embodiment of the present invention that, two coordinates corresponding to two boundaries that are of each layer in multiple layers of a to-be-displayed image frame and that are in a direction of a first coordinate axis are first obtained, and multiple coordinates corresponding to the multiple layers can be obtained; then, the to-be-displayed image frame is divided into at least two image segments in the direction of the first coordinate axis by using the multiple coordinates, where two boundaries of any image segment correspond to two neighboring coordinates in the multiple coordinates, the any image segment includes a part that is in at least one layer and that falls within an interval at which the image segment is located, and a part that is in any layer and that falls within the interval at which the image segment is located is a sublayer of the any layer; next, the at least two image segments are read along the direction of the first coordinate axis in a time-division manner and according to a scanning sequence; and finally, image synthesis is successively performed on the at least two image segments according to a time sequence of reading the at least two image segments in the time-division manner, so as to generate display data, where image synthesis for an image segment includes image synthesis for all sublayers that are included in the image segment. In this embodiment of the present invention, because the to-be-displayed image frame is divided into the at least two image segments, the image frame is also read in the time-division manner and according to the image segments, and when image synthesis is finally performed, the image segments are also synthesized segment-by-segment according to the time sequence of reading the at least two image segments, and multiple pieces of display data can be generated, where the generated display data can be directly displayed. Because each layer of the to-be-displayed image frame in this embodiment of the present invention is divided into multiple sublayers according to intervals at which the image segments are located, after an image segment is completely divided, the image segment can be read in time to perform image synthesis, so that image synthesis efficiency in this embodiment of the present embodiments can be improved. Units or modules that are in the image chip 500 described in either FIG. 5a or FIG. 5b may be integrated into a semiconductor by using an integrated circuit production technology.

Embodiment 3

Figure 6:
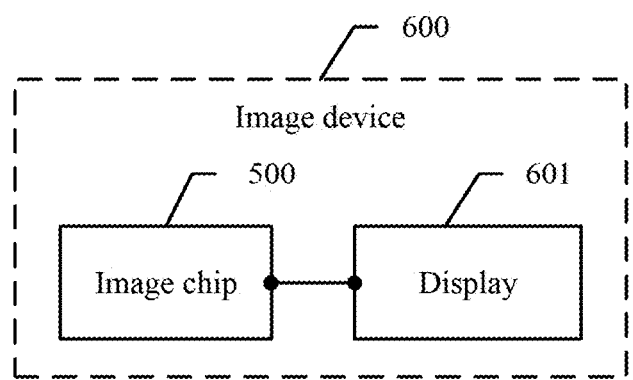
FIG. 6 is a schematic structural diagram of an image device according to an embodiment of the present invention.

As shown in FIG. 6, this embodiment of the present invention further provides an image device 600 that may include: the image chip 500 described in either FIG. 5a or FIG. 5b, and a display 601.

The display 601 is configured to display data generated by the image chip.

It should be known that the display 601 is generally used as a terminal screen in a mobile terminal or another household terminal, and the display 601 plays a role of the terminal screen described in the foregoing embodiments and is configured to display the display data generated by the image chip.

It can be understood that the image device provided in this embodiment of the present invention may include but is not limited to multiple product forms that need to perform image synthesis, such as a mobile terminal, a tablet computer, a desktop computer, and a household terminal.

It can be learned from the foregoing description of this embodiment of the present invention that, because a to-be-displayed image frame in an image chip is divided into at least two image segments, the image frame is also read in a time-division manner and according to the image segments, and when image synthesis is finally performed, the image segments are also synthesized segment-by-segment, and multiple pieces of display data can be generated, where the generated display data can be directly displayed. Because each layer of the to-be-displayed image frame in this embodiment of the present invention is divided into multiple sublayers according to intervals at which the image segments are located, after an image segment is completely divided, the image segment can be read in time to perform image synthesis, so that the image device in this embodiment of the present invention can improve image synthesis efficiency.

Embodiment 4

Figure 7:
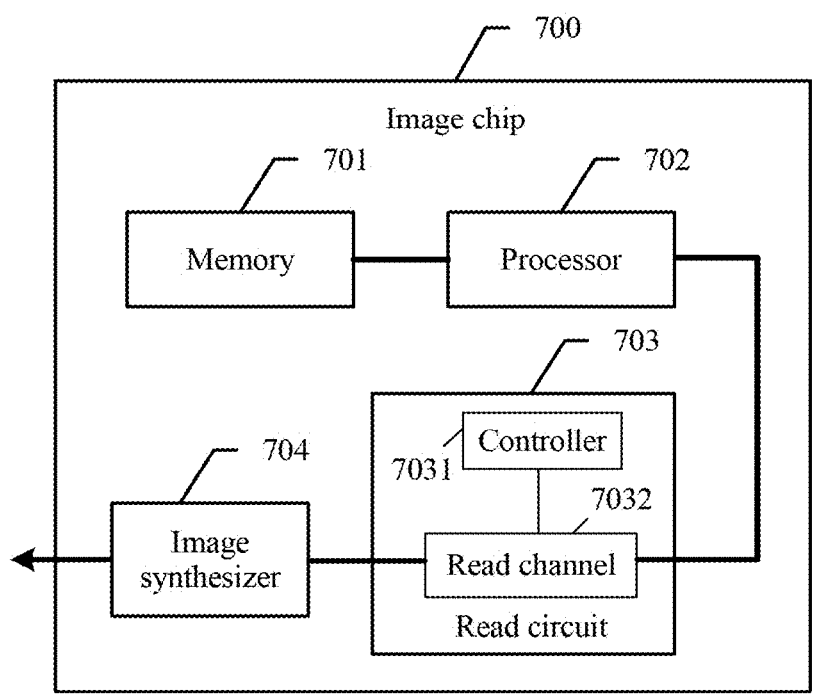
FIG. 7 is a schematic structural diagram of another image chip according to an embodiment of the present invention.

As shown in FIG. 7, this embodiment of the present invention further provides another image chip 700, where the image chip 700 includes: a memory 701, a processor 702, a read circuit 703, and an image synthesizer 704.

The memory 701 is configured to store a to-be-displayed image frame.

The processor 702 is configured to: read the image frame stored in the memory 701, and separately obtain two coordinates, on a first coordinate axis, corresponding to two boundaries that are of each layer in multiple layers of the image frame and that are perpendicular to the first coordinate axis, so as to obtain multiple coordinates corresponding to the multiple layers; and divide, by using the multiple coordinates, the to-be-displayed image frame into at least two image segments perpendicular to the first coordinate axis, where two boundaries of any image segment correspond to two neighboring coordinates in the multiple coordinates, the any image segment includes a part that is in at least one layer and that falls within an interval at which the image segment is located, and a part that is in any layer and that falls within the interval at which the image segment is located is a sublayer of the any layer.

The read circuit 703 is configured to read, along a direction of the first coordinate axis, in a time-division manner and according to a scanning sequence, the at least two image segments obtained by division by the processor 702.

The image synthesizer 704 is configured to successively perform image synthesis on the at least two image segments according to a time sequence in which the read circuit 703 reads the at least two image segments, so as to generate display data, where image synthesis for an image segment includes image synthesis for all sublayers that are included in the image segment.

In some embodiments of the present invention, the image synthesizer 704 is specifically configured to perform the following steps: along the direction of the first coordinate axis and according to the scanning sequence, reading each sublayer in a first image segment at a first time, and reading each sublayer in an $n^{th}$ image segment at an $n^{th}$ time; and repeating this step until n is equal to N, where n is an integer greater than or equal to 2, and N is a quantity of image segments included in the at least two image segments.

In some embodiments of the present invention, the read circuit 703 may specifically include a controller 7031 and at least one read channel 7032, where the read channel is a data reading channel constituted by hardware resources, and a specific implementation form of the read channel includes but is not limited to a bus, a data transmission line, a set of electronic components that have a data reading capability, or the like. The controller 7031 may control, by using a channel command, input/output, interruption, channel release, and the like that are of the at least one read channel 7032, and for a specific implementation form of the controller, reference may be made to prior technologies. The controller 7031 is configured to perform the following step: separately allocating, among the at least one read channel 7032 and at an $m^{th}$ time, one read channel to each sublayer in an $m^{th}$ image segment, where m is any integer less than or equal to N, and N is the quantity of image segments included in the at least two image segments.

Correspondingly, the image synthesizer 704 reads each sublayer in the $m^{th}$ image segment by using each read channel allocated to each sublayer.

In the foregoing embodiment, further, the controller 7031 is specifically configured to perform the following steps: when a quantity of all sublayers in the $m^{th}$ image segment is less than or equal to a quantity of read channels in the at least one read channel, allocating all the sublayers in the $m^{th}$ image segment to the at least one read channel at the $m^{th}$ time, where one unique sublayer is allocated to one read channel at the $m^{th}$ time; or when a quantity of all sublayers in the $m^{th}$ image segment is greater than a quantity of read channels in the at least one read channel, allocating all the sublayers in the $m^{th}$ image segment to the at least one read channel at several times, where one sublayer is allocated to one read channel in one allocation process.

In this embodiment of the present invention, the controller 7031 is further configured to perform the following steps: when another sublayer, except an already read sublayer, in a layer to which the already read sublayer in the $m^{th}$ image segment belongs is already read, releasing a read channel allocated to the already read sublayer in the $m^{th}$ image segment; or when there is another unread sublayer, except an already read sublayer, in a layer to which the already read sublayer in the $m^{th}$ image segment belongs, continuing to read the another unread sublayer by using a read channel allocated to the already read sublayer in the $m^{th}$ image segment.

The components in this embodiment may correspond to the units provided in Embodiment 2, where the processor 702 corresponds to the obtaining unit and the layer division unit, the read circuit 703 corresponds to the image reading unit, and the layer synthesizer 704 corresponds to the image synthesis unit. In view of this, for related characteristics of the image chip provided in this embodiment, reference may be made to the image chip provided in Embodiment 2. In addition, for some corresponding characteristics in Embodiment 1, details are not described repeatedly for brevity, and reference may be specifically made to the description in Embodiment 1.

It can be learned from the foregoing description of this embodiment of the present invention that, two coordinates corresponding to two boundaries that are of each layer in multiple layers of a to-be-displayed image frame and that are in a direction of a first coordinate axis are first obtained, and multiple coordinates corresponding to the multiple layers can be obtained; then, the to-be-displayed image frame is divided into at least two image segments in the direction of the first coordinate axis by using the multiple coordinates, where two boundaries of any image segment correspond to two neighboring coordinates in the multiple coordinates, the any image segment includes a part that is in at least one layer and that falls within an interval at which the image segment is located, and a part that is in any layer and that falls within the interval at which the image segment is located is a sublayer of the any layer; next, the at least two image segments are read along the direction of the first coordinate axis in a time-division manner and according to a scanning sequence; and finally, image synthesis is successively performed on the at least two image segments according to a time sequence of reading the at least two image segments in the time-division manner, so as to generate display data, where image synthesis for an image segment includes image synthesis for all sublayers that are included in the image segment. In this embodiment of the present invention, because the to-be-displayed image frame is divided into the at least two image segments, the image frame is also read in the time-division manner and according to the image segments, and when image synthesis is finally performed, the image segments are also synthesized segment-by-segment according to the time sequence of reading the at least two image segments, and multiple pieces of display data can be generated, where the generated display data can be directly displayed. Because each layer of the to-be-displayed image frame in this embodiment of the present invention is divided into multiple sublayers according to intervals at which the image segments are located, after an image segment is completely divided, the image segment can be read in time to perform image synthesis, so that image synthesis efficiency in this embodiment of the present invention can be improved.

In addition, it should be noted that the described apparatus embodiments are merely exemplary. The units described as separate parts may or may not be physically separate, and parts displayed as units may or may not be physical units, may be located in one position, or may be distributed on multiple network units. Some or all of the modules may be selected according to actual needs to achieve the objectives of the solutions of the embodiments. In addition, in the accompanying drawings of the apparatus embodiments provided in the present invention, connection relationships between the modules indicate that the modules have communication connections with each other, which may be specifically implemented as one or more communications buses or signal cables. Persons of ordinary skill in the art may understand and implement the embodiments of the present invention without creative efforts.

Based on the description of the foregoing implementation manners, persons skilled in the art may clearly understand that the present embodiments may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present embodiments, implementation by a software program is a better implementation manner in most cases. Based on such an understanding, the technical solutions of the present embodiments essentially or the part contributing to the prior art may be implemented in a form of a software product. The software product is stored in a readable storage medium, such as a floppy disk, a universal serial bus (USB) flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of the present invention.

The foregoing embodiments are merely intended for describing the technical solutions of the present embodiments, but not for limiting the present embodiments. Although the present embodiments is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An image chip, comprising:
    a processor; and
    a non-transitory computer-readable storage medium storing a program to be executed by the processor, the program including instructions for:
        dividing an image frame into at least two image segments, wherein the image frame comprises multiple layers, each layer in the multiple layers is a rectangular layer having two respective first boundaries, the at least two image segments include a first image segment, two first boundaries of the first image segment correspond to two neighboring boundaries in all the first boundaries of the multiple layers, the first image segment comprises at least a part of a first layer in the multiple layers, and the at least part of the first layer is a sublayer of the first layer;
        reading, with a read circuit of the image chip, the at least two image segments in a time-division manner; and
        successively performing image synthesis, with an image synthesizer of the image chip, on the at least two image segments according to a time sequence read by the read circuit, to generate display data corresponding to the image frame, wherein image synthesis for each image segment in the at least two image segments comprises image synthesis for all sublayers in the respective image segment.

2. The image chip according to claim 1, wherein the first image segment further comprises at least a part of a second layer in the multiple layers, and the at least part of the second layer is a sublayer of the second layer.

3. The image chip according to claim 1, wherein the two respective first boundaries of each layer in the multiple layers are perpendicular to a first coordinate axis.

4. The image chip according to claim 1, wherein the read circuit comprises:
    a control circuit configured to separately allocate, at an mth time, a respective read channel in at least one read channel to each sublayer in an mth image segment, wherein m is an integer less than or equal to N, and N is a quantity of image segments in the at least two image segments; and
    wherein each read channel of the at least one read channel is coupled to the control circuit, and each read channel in the at least one read channel is configured to read one respective sublayer that is allocated by the control circuit to the respective read channel at the mth time.

5. The image chip according to claim 4, wherein the control circuit is further configured to:
    allocate all sublayers in the mth image segment to the at least one read channel at the mth time when a quantity of all of the sublayers in the mth image segment is less than or equal to a quantity of read channels in the at least one read channel, wherein each sublayer is allocated to one respective read channel at the mth time.

6. The image chip according to claim 4, wherein the control circuit is further configured to:
    when a quantity of all sublayers in the mth image segment is greater than a quantity of read channels in the at least one read channel, allocate sublayers in the mth image segment to the at least one read channel multiple times within the mth time until all sublayers in the mth image segment have been allocated at least one time, wherein each sublayer is allocated to one respective read channel in one allocation process.

7. The image chip according to claim 4, wherein the control circuit is further configured to:
release a read channel allocated to an already read sublayer in the mth image segment when another sublayer other than the already read sublayer is already read, wherein the another sublayer and the already read sublayer belong to a same layer.

8. The image chip according to claim 4, wherein the control circuit is further configured to:
continue to read another sublayer other than an already read sublayer using a read channel allocated to the already read sublayer in the mth image segment.

9. An image chip, comprising:
a layer division circuit, configured to divide an image frame into at least two image segments, wherein the image frame comprises multiple layers, each layer in the multiple layers is a rectangular layer having two respective first boundaries, the at least two image segments include a first image segment, two first boundaries of the first image segment correspond to two neighboring boundaries in all the first boundaries of the multiple layers, the first image segment comprises at least a part of a first layer in the multiple layers, and the at least part of the first layer is a sublayer of the first layer;
an image reading circuit, configured to read the at least two image segments in a time-division manner; and
an image synthesis circuit, configured to successively perform image synthesis on the at least two image segments according to a time sequence read by the image reading circuit, to generate display data corresponding to the image frame, wherein image synthesis for each image segment in the at least two image segments comprises image synthesis for all sublayers in the respective image segment.

10. The image chip according to claim 9, wherein the first image segment further comprises at least a part of a second layer in the multiple layers, and the at least part of the second layer is a sublayer of the second layer.

11. The image chip according to claim 9, wherein the two respective first boundaries of each layer in the multiple layers are perpendicular to a first coordinate axis.

12. The image chip according to claim 9, wherein the image reading circuit comprises:
a control circuit configured to separately allocate, at an mth time, a respective read channel in at least one read channel to each sublayer in an mth image segment, wherein m is an integer less than or equal to N, and N is a quantity of image segments in the at least two image segments; and
wherein each read channel of the at least one read channel is coupled to the control circuit, and each read channel in the at least one read channel is configured to read one respective sublayer that is allocated by the control circuit to the respective read channel at the mth time.

13. The image chip according to claim 12, wherein the control circuit is further configured to:
allocate all sublayers in the mth image segment to the at least one read channel at the mth time when a quantity of all of the sublayers in the mth image segment is less than or equal to a quantity of read channels in the at least one read channel, wherein each sublayer is allocated to one respective read channel at the mth time.

14. The image chip according to claim 12, wherein the control circuit is further configured to:
when a quantity of all sublayers in the mth image segment is greater than a quantity of read channels in the at least one read channel, allocate sublayers in the mth image segment to the at least one read channel multiple times within the mth time until all sublayers in the mth image segment have been allocated at least one time, wherein each sublayer is allocated to one respective read channel in one allocation process.

15. The image chip according to claim 12, wherein the control circuit is further configured to:
release a read channel allocated to an already read sublayer in the mth image segment when another sublayer other than the already read sublayer is already read, wherein the another sublayer and the already read sublayer belong to a same layer.

16. The image chip according to claim 12, wherein the control circuit is further configured to:
continue to read another sublayer other than an already read sublayer using a read channel allocated to the already read sublayer in the mth image segment.

17. A method comprising:
dividing an image frame into at least two image segments, wherein the image frame comprises multiple layers, each layer in the multiple layers is a rectangular layer having two respective first boundaries, the at least two image segments include a first image segment, two first boundaries of the first image segment correspond to two neighboring boundaries in all the first boundaries of the multiple layers, the first image segment comprises at least a part of a first layer in the multiple layers, and the at least part of the first layer is a sublayer of the first layer;
reading the at least two image segments in a time-division manner; and
successively performing image synthesis on the at least two image segments according to a time sequence of the reading, to generate display data corresponding to the image frame, wherein image synthesis for each image segment in the at least two image segments comprises image synthesis for all sublayers in the each image segment.

18. The method according to claim 17, wherein the first image segment further comprises at least a part of a second layer in the multiple layers, and the at least part of the second layer is a sublayer of the second layer.

19. The method according to claim 17, wherein the two respective first boundaries of each layer in the multiple layers are perpendicular to a first coordinate axis.

20. The method according to claim 17, wherein reading the at least two image segments in the time-division manner comprises:
separately allocating, at an mth time, a respective read channel in at least one read channel to each sublayer in an mth image segment, wherein m is an integer less than or equal to N, and N is a quantity of image segments in the at least two image segments; and
reading, by each read channel in the at least one read channel, one respective sublayer that is allocated to the each read channel at the mth time.

* * * * *